March 25, 1924.  1,487,953

E. T. KISSINGER

INDICATOR FOR BALING PRESSES

Original Filed Nov. 29, 1922

Inventor.
Elmer T. Kissinger
By Chas. J. O'Neill, Atty.

Patented Mar. 25, 1924.

1,487,953

UNITED STATES PATENT OFFICE.

ELMER T. KISSINGER, OF CRESTON, OHIO.

INDICATOR FOR BALING PRESSES.

Application filed November 29, 1922, Serial No. 604,080. Renewed September 12, 1923.

*To all whom it may concern:*

Be it known that I, ELMER T. KISSINGER, a citizen of the United States, residing at Creston, Ohio, have invented certain new and useful Improvements in Indicators for Baling Presses; and I do hereby declare the following to be a full, clear, and exact description of the invention, such as will enable others skilled in the art to which it appertains to make and use the same.

The invention relates to certain new and useful improvements in indicators for baling presses, and involves a specific improvement on the construction and mode of operation of the indicator shown and described in my prior Patent, No. 1,431,587, dated October 10th, 1922, the object of the instant invention being to provide a simplified means for mounting the tracer wheel to regulate the pressure between the wheel and the bale, and to provide resilient means in the support for the tracer wheel to permit the latter to yield upon encountering obstructions, and to immediately return to operative position when the obstruction is passed.

The invention is illustrated in the accompanying drawings, in which:—

Figure 3:
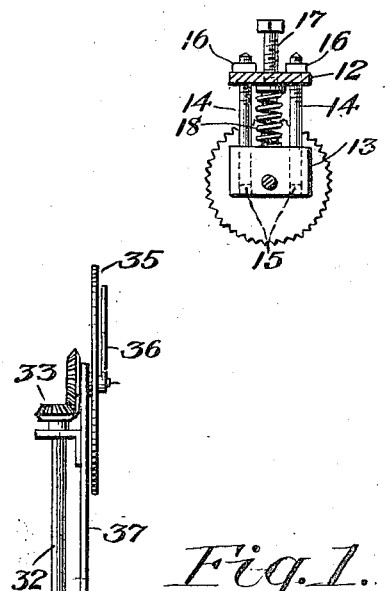
Fig. 3 is a plan view of a tracer wheel, and its mounting.

Referring to the drawings, 1 indicates a conventional form of baling press, having the usual end frame 2.

Figure 2:
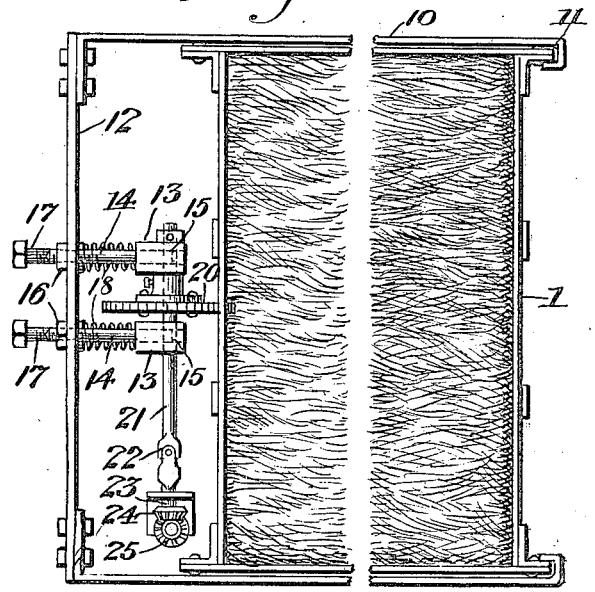
Fig. 2 is an end view of the same, partly broken away.
Figure 1:
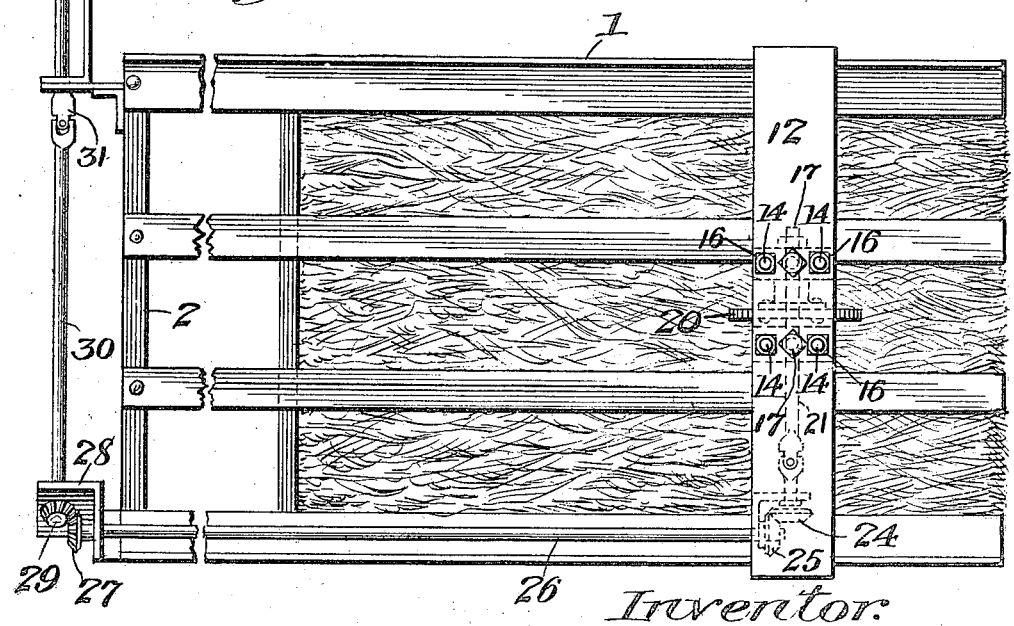
Fig. 1 is a side elevation, broken away in part, of a baling press having the indicator of the invention applied thereto.

Secured transversely to the baling press is a yoke 10 having hooked ends 11, or other suitable means for attaching the yoke to the frame of the press, said yoke including a connecting bar 12, spaced from the side of the baling press and parallel with the side thereof, as shown in Fig. 2. Mounted in suitable openings in the bar 12 are two sets of spaced studs 14, 14, each having a nut 16 on its outer end, by means of which it is secured to the bar 12, the inner ends of each of the studs 14 engaging openings 15 in bearing blocks 13, 13, which are spaced vertically to receive the shaft of the tracer wheel, as hereinafter described.

Threaded in a suitable opening in the bar 12 between each of the sets of guide studs 14, is a screw 17, between the head on the lower end of which and the corresponding bearing block 13 is interposed a helical spring 18, which tends to force each of the bearing blocks away from the bar 12 and toward the side of the bale being formed in the press.

Journalled in the blocks 13, 13 is a shaft 21, upon which is secured a tracer wheel 20, having its periphery provided with teeth, which engage the side of the moving bale, as the latter passes through the press. The connections between the tracer wheel 20 and a suitable indicating device are preferably similar to those shown in my prior patent aforesaid, and include the universal coupling 22, interposed between the shaft 21 and a small stub shaft 23, carrying on its lower end a beveled pinion 24, which meshes with a beveled gear 25 on a longitudinal shaft 26, journalled in suitable brackets carried by the press frame. On the outward end of the shaft 26 is a beveled gear 27 meshing with similar beveled gear 29 on the lower end of shaft 30, which latter is connected by a universal coupling 31 with shaft section 32, carrying at its upper end a beveled gear 33, meshing with a similar gear 34, upon the shaft of which is mounted an indicator hand 36, which sweeps over a circular dial 35, the extent of movement of the hand 36 over the dial indicating the length of the bale, as the latter passes through the press.

It will be particularly noted that the springs 18, acting upon the bearing blocks 13, hold the tracer wheel firmly, but yieldably in contact with the side of the bale, so that the movement of the bale through the press will effect a rotation of the tracer wheel which is transmitted through the shafting and gearing to the dial mechanism, which is located on one end of the press, as shown. Furthermore, the tension of the springs may be regulated by the adjusting screws 17. Should the tracer wheel encounter an obstruction in the bale, the tracer wheel in its bearing blocks moves outwardly against the tension of the springs, until the obstruction is passed, and the danger of damaging the indicating apparatus by sudden shocks and jars is completely obviated, after which the springs will force the tracer wheel into engagement with the bale. By adjusting the tension of the springs, the tracer wheel may be forced into contact with the contents of the bale with properly regulated pressure to insure a uniform rotation of the tracer wheel in strict accordance with the movement of the bale, whereby an accurate indication will be transmitted from the tracer wheel to the dial.

What I claim is:—

1. An indicator for baling presses comprising a dial, a tracer wheel, connections between the tracer wheel and dial, and means for supporting the tracer wheel in contact with the bale within the press including a yoke having a bar parallel with and spaced from the side of the bale, bearing blocks for the tracer wheel shaft slidably supported, from said bar and movable toward and from the bale, and adjustable spring pressure means interposed between said bar and said bearing blocks.

2. An indicator for baling presses comprising a dial, a tracer wheel, connections between the tracer wheel and dial, and means for supporting the tracer wheel in contact with the bale within the press including a yoke having a bar parallel with the side of the bale, guide studs carried by said bar, bearing blocks for the tracer wheel shaft on said guide studs and movable toward and from the bale, and adjustable spring pressure means interposed between said bar and said bearing blocks.

3. An indicator for baling presses comprising a dial, a tracer wheel, connections between the tracer wheel and dial, and means for supporting the tracer wheel in contact with the bale within the press including a yoke having a bar parallel with the side of the bale, parallel pairs of guide studs carried by said bar, bearing blocks for the tracer wheel shaft on said guide studs and movable toward and from the bale, and adjustable spring pressure means interposed between said bar and said bearing blocks.

In testimony whereof I affix my signature.

ELMER T. KISSINGER.